(12) United States Patent
Macalet et al.

(10) Patent No.: US 9,253,242 B2
(45) Date of Patent: Feb. 2, 2016

(54) METHODS, SYSTEMS, AND COMPUTER READABLE MEDIA FOR ASSIGNING SEPARATE DEDICATED BEARERS FOR AUDIO AND VIDEO STREAMS IN A TEST SIMULATION ENVIRONMENT

(71) Applicant: Ixia, Calabasas, CA (US)

(72) Inventors: Catalina Macalet, Bucharest (RO); Stefan Constantin Puiu, Bucharest (RO)

(73) Assignee: IXIA, Calabasas, CA (US)

( * ) Notice: Subject to any disclaimer, the term of this patent is extended or adjusted under 35 U.S.C. 154(b) by 203 days.

(21) Appl. No.: 13/917,298

(22) Filed: Jun. 13, 2013

(65) Prior Publication Data
US 2014/0369343 A1 Dec. 18, 2014

(30) Foreign Application Priority Data

Jun. 12, 2013 (RO) .............................. A 2013 00442

(51) Int. Cl.
*H04L 12/66* (2006.01)
*H04L 29/06* (2006.01)

(52) U.S. Cl.
CPC ............ *H04L 65/80* (2013.01); *H04L 65/1069* (2013.01)

(58) Field of Classification Search
CPC .. H04L 65/607; H04L 29/06027; H04L 65/80
USPC ........................................................ 370/352
See application file for complete search history.

(56) References Cited

U.S. PATENT DOCUMENTS

| | | | | |
|---|---|---|---|---|
| 6,996,083 | B1* | 2/2006 | Balachandran ...... | H04B 7/2643 370/337 |
| 2001/0040883 | A1* | 11/2001 | Chang .................. | H04B 7/2656 370/344 |
| 2001/0053145 | A1* | 12/2001 | Willars ............... | H04L 12/4604 370/352 |
| 2003/0161325 | A1* | 8/2003 | Kekki .................... | H04Q 11/04 370/395.43 |
| 2006/0088035 | A1* | 4/2006 | Beeson ............. | H04L 29/06027 370/395.52 |
| 2007/0081471 | A1* | 4/2007 | Talley et al. .................... | 370/252 |
| 2007/0107034 | A1* | 5/2007 | Gotwals ........................ | 725/129 |

(Continued)

OTHER PUBLICATIONS

"IMS Profile for Conversational Video Service," Official Document IR.94, Version 5.0, GSM Association, pp. 1-16 (Mar. 4, 2013).

(Continued)

*Primary Examiner* — Asad Nawaz
*Assistant Examiner* — Syed S Ali
(74) *Attorney, Agent, or Firm* — Jenkins, Wilson, Taylor & Hunt, P.A.

(57) ABSTRACT

Methods, systems, and computer readable media for assigning separate dedicated bearers for separate audio and video streams in a test simulation environment are disclosed. In one embodiment, the method includes generating dedicated bearer information associated with each of a dedicated audio bearer and a dedicated video bearer to be used for a communication session and providing the dedicated bearer information to a simulation device. The method further includes, from the simulation device, using the dedicated bearer information to negotiate establishment of the dedicated audio bearer and the dedicated video bearer between the simulation device and a system under test (SUT) and sending simulated traffic data to the SUT over the dedicated audio bearer and the dedicated video bearer in accordance with a mapping based on the dedicated bearer information and identifiers included in the simulated traffic.

18 Claims, 3 Drawing Sheets

(56) References Cited

U.S. PATENT DOCUMENTS

| | | | | |
|---|---|---|---|---|
| 2007/0198218 A1* | 8/2007 | Sankala | ............... | H04L 12/2697 702/186 |
| 2008/0151752 A1* | 6/2008 | Evans | ................. | H04L 12/2697 370/235 |
| 2008/0268770 A1* | 10/2008 | Ashbrook et al. | ............ | 455/3.01 |
| 2009/0328190 A1* | 12/2009 | Liu | ..................... | H04L 12/2697 726/14 |
| 2010/0268991 A1* | 10/2010 | Birch | .................. | G06F 11/2215 714/32 |
| 2011/0069626 A1* | 3/2011 | Sun et al. | ....................... | 370/252 |
| 2013/0143579 A1* | 6/2013 | Kwan et al. | ................... | 455/445 |

OTHER PUBLICATIONS

"Digital cellular telecommunications system (Phase 2+); Universal Mobile Telecommunications System (UMTS); LTE; Single Radio Voice Call Continuity (SRVCC); Stage 2 (3GPP TS 23.216 version 9.9.0 Release 9)," ETSI TS 123 216, V9.9.0, pp. 1-45 (Mar. 2012).

* cited by examiner

METHODS, SYSTEMS, AND COMPUTER READABLE MEDIA FOR ASSIGNING SEPARATE DEDICATED BEARERS FOR AUDIO AND VIDEO STREAMS IN A TEST SIMULATION ENVIRONMENT

PRIORITY CLAIM

This application claims the benefit of Romanian Patent Application No, A/00442/2013, filed Jun. 12, 2013; the disclosure of which is incorporated herein by reference in its entirety.

TECHNICAL FIELD

The subject matter described herein relates to techniques for simulating at least one communication session that includes both an audio stream and a video stream. More particularly, the subject matter described herein relates to methods, systems, and computer readable media for assigning separate dedicated bearers for separate audio and video streams in a test simulation environment.

BACKGROUND

Presently, the IR.94 specification (i.e., Official Document IR.94—The IP Multimedia Subsystem (IMS) Profile for Conversational Video Service by GSM Association, Version 5.0, 4 Mar. 2013, the disclosure of which is incorporated by reference in its entirety) sets forth how a voice session involving both an audio stream and video stream is to be communicated over a long term evolution (LTE) network. Specifically, a voice over LTE (VoLTE) communication session including both audio and video components requires a separate evolved packet system (EPS) dedicated bearer for each of the audio data and the video data, Although IR.94 specifies the requirement for separate EPS dedicated bearers, the specification does not indicate an architecture that allows for a mechanism to map different types of real-time transport protocol (RTP) traffic to the different dedicated EPS bearers. Current systems that process VoLTE traffic typically utilize packet inspection techniques to determine how traffic is mapped to EPS bearers. However, packet inspection processing typically requires inspection of a number of data portions of a packet for a number of different criteria. Notably, such a technique creates efficiency problems associated with test simulation scenarios where a high throughput of data is required.

Accordingly, there exist a need for methods, systems, and computer readable media for assigning separate dedicated bearers for separate audio and video streams in a test simulation environment.

SUMMARY

The subject matter described herein includes methods, systems, and computer readable media for assigning separate dedicated bearers for separate audio and video streams in a test simulation environment. According to one aspect, a method includes generating dedicated bearer information associated with each of a dedicated audio bearer and a dedicated video bearer to be used for a communication session and providing the dedicated bearer information to a simulation device. The method further includes, from the simulation device, using the dedicated bearer information to negotiate establishment of the dedicated audio bearer and the dedicated video bearer between the simulation device and a system under test (SUT) and sending simulated traffic data to the SUT over the dedicated audio bearer and the dedicated video bearer in accordance with a mapping based on the dedicated bearer information and identifiers included in the simulated traffic.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
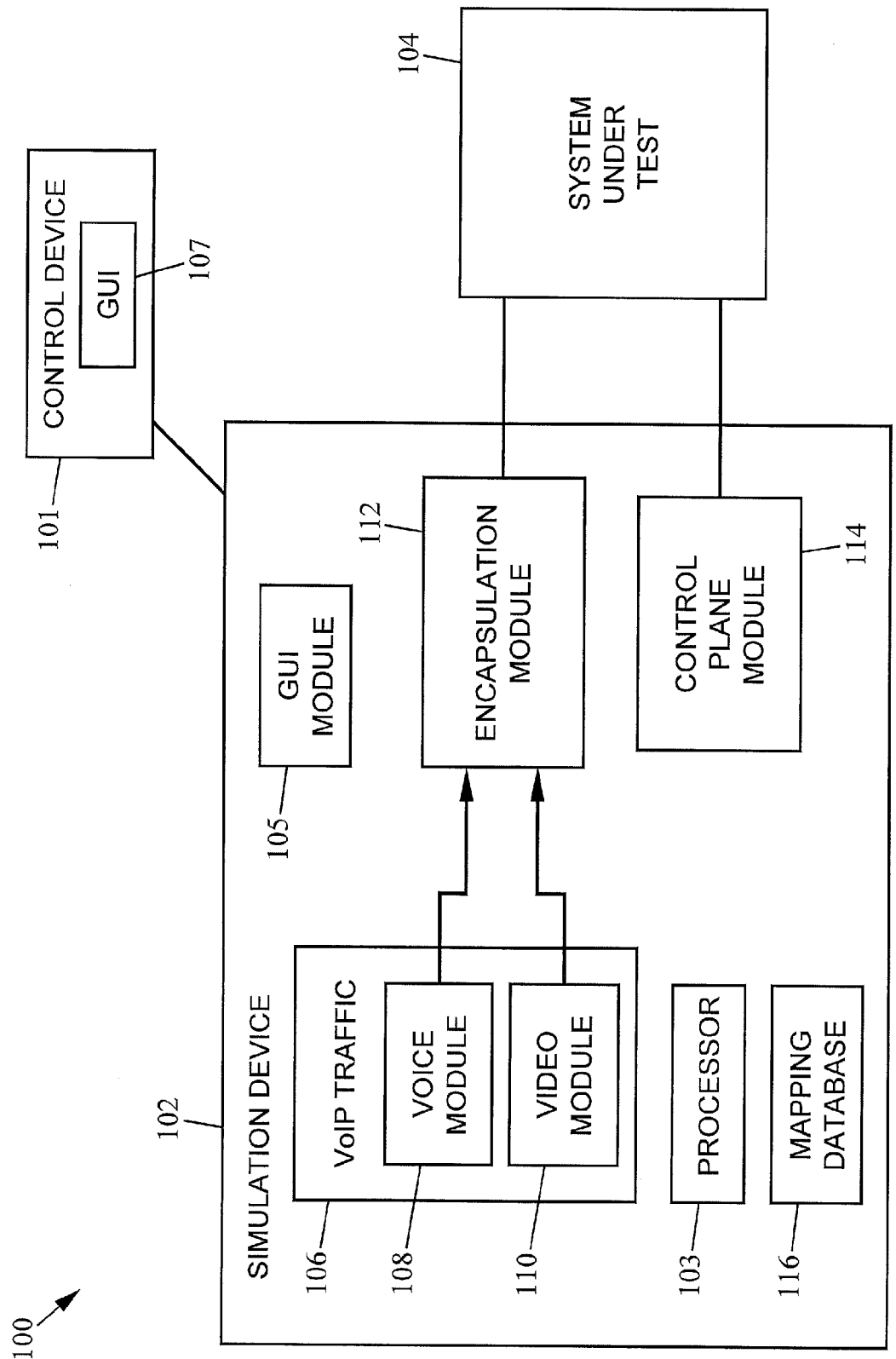
FIG. 1 is a block diagram illustrating details of an exemplary system for assigning separate dedicated bearers for separate audio and video streams in a test simulation environment according to an embodiment of the subject matter described herein.

Methods, systems, and computer readable media for assigning separate dedicated bearers for audio and video traffic streams in a test simulation environment are disclosed. FIG. 1 is a block diagram illustrating an exemplary overall architecture for a simulation system 100 according to an embodiment of the subject matter described herein. Referring to FIG. 1, system 100 includes a simulation device 102 that is communicatively connected to a control device 101 and a system under test (SUT) 104. In one embodiment, SUT 104 may include one or more devices or network elements or devices under test, such as a serving gateway (SGW), a packet data network gateway (PGW), a policy and charging rules function (PCRF) node, and the like. In another embodiment, SUT 104 may include any plurality of devices that collectively hands both GPRS tunneling protocol (GTP) signaling traffic and media traffic (e.g., voice and/or video traffic).

Control device 101 may include any computer or computing device usable by a network operator, a test simulation administrator, or any other user to initiate and establish parameters for a traffic test simulation. SUT 104 may include any network element, such as a serving gateway (SGW), which may benefit from high throughput traffic simulation testing.

In some embodiments, simulation device 102 may include a processor 103, a graphical user interface (GUI) module 105, a voice over Internet protocol (VoIP) traffic generation module 106, an encapsulation module 112 (e.g., a GTP encapsulation module), and a control plane module 114. For example, processor 103 may include a central processing unit, a microcontroller, or any like hardware based processing unit. Processor 103 may be configured to manage and execute modules 106-114 in simulation device 102.

VoIP traffic generation module 106 may include a voice module 108, which may be configured to generate audio traffic data, and a video module 110, which may be configured to generate video traffic data. In one example, voice module 108 may include a software based module (when executed by a hardware based processing unit in simulation device 102) that is configured to generate voice based simulation traffic in a particular L4-L7 protocol. For example, voice module 108 may be configured to generate RTP data that is ultimately provided to SUT 104. Similarly, video module 110 may include a software based module (when executed by a hardware based processing unit in simulation device 102) that is configured to generate video based simulation traffic in a particular L4-L7 protocol. Synchronization of traffic generated by voice module 108 and video module 110 (for purposes of processing by encapsulation module 112) may be conducted by conventional means.

GUI module 105 may be configured to receive instructions and data (e.g., dedicated bearer information) from control device 101. In some embodiments, GUI module 105 receives bearer designation information from GUI 107 displayed on a control device 101. Inputs and instructions provided via the GUI of control device 101 are communicated to GUI module 105 in simulation device 102. An exemplary configuration GUI is described below and depicted in FIG. 2.

In one embodiment, control plane module 114 may include a GTP control plane module that is configured to conduct the negotiation of establishment (and/or tear down) of GTP tunnels or bearers. For example, control plane module 114 may communicate with SUT 104 to establish a plurality of evolved packet system (EPS) bearers that may be used to communicate encapsulated voice and video traffic components of a layer 4-layer 7 (L4-L7) protocol flow associated with a voice over LTE (VoLTE) session or call. In one embodiment, an EPS bearer may be described as sub-tunnel (connecting simulation device 102 and SUT 104) that shares the same underlying IP address information, but has different quality of service (QoS) or latency constraints. For example, a first bearer that is established for communicating hypertext transfer protocol (HTTP) may be configured such that latencies are not a concern. Similarly, a second bearer may be established for voice communication. In contrast to the first bearer, the second bearer may be configured to handle the voice communication with a low level of latency, communicate the voice communication via a certain amount of bandwidth throughput.

In one embodiment, a test simulation administrator may utilize GUI 107 that is hosted by control device 101 to establish parameters for a voice session simulation (e.g., an S11/S1-u simulation in which simulation device 102 emulates an MME and a PDN gateway). As described in greater detail below with respect to FIG. 2, GUI 107 may be used to select and designate dedicated bearers for a VoLTE communication session (e.g., a test simulation session). For each dedicated bearer, a bearer special function and associated performance parameters/configurations may be selected (i.e., generated) using GUI 107. For example, the generation of dedicated bearer information may include utilizing GUI 107 to select and generate the dedicated bearer information for a dedicated audio bearer and a dedicated video bearer. In one embodiment, control device 101 may communicate the generated dedicated bearer information (e.g., bearer special function designation and dedicated bearer selections/configurations) to GUI module 105 of simulation device 102 prior to a simulation test. In response, GUI module 105 may in turn provide the dedicated bearer information to GTP encapsulation module 112. After the dedicated bearer information is provided to simulator 102 from control device 101, encapsulation module 112 retains the information until the actual EPS bearers are negotiated and established (see details below).

After the dedicated bearer information is selected by test simulation administrator, generated by control device 101, and provided to simulation device 102, simulation device 102 may initiate a test simulation (per an instruction or command from control device 101) for SUT 104 by simulating an MME that attempts to establish a default bearer (e.g., a GTPv2 default bearer that is negotiated when a 4G phone gets on the network). Simulation device 102 then conducts a session initiation protocol (SIP) negotiation process with SUT 104. In response to the SIP negotiation, SUT 104 may initiate the negotiation for establishing two dedicated bearers between simulation device 102 and SUT 104. For example, during the SIP negotiation process, SUT 104 and simulation device 102 establish whether the call session is to include video media, voice media, or both. Once the SIP negotiation process is conducted, simulation device 102 may trigger control plane module 114 to initiate a control plane procedure for dedicated bearer creation (e.g., the negotiation for establishing the dedicated audio bearer and video bearer is initiated by the SUT or DUT). For example, a P-CSCF node simulated by simulation device 102 may trigger a GTPv2 control plane procedure for the creating the dedicated bearers. In one embodiment, SUT 104 may send a create bearer request to the simulated MME in simulation device 102, which in turn replies with a create bearer response message.

After the dedicated audio stream bearer and a dedicated video stream bearer are both negotiated and established, simulation device 102 may be configured to generate simulated traffic data, such as VoIP traffic data. In one embodiment, the simulated VoIP traffic data includes RTP traffic data. VoIP traffic generation module 106 may be instructed by control device 101 to begin generating the necessary simulated traffic data. For example, VoIP traffic generation module 106 may direct voice module 108 to generate the audio traffic data and direct video module 110 to generate the video traffic data for the simulated session. In one embodiment, the simulated session may include an eNodeB/MME S11/S1-u simulation involving GTP control plane and encapsulation processes.

In some embodiments, each of voice module 108 and video module 110 may generate traffic data that respectively includes an identifier that indicates the traffic data type. For example, simulated traffic data from voice module 108 may include an identifier that designates the simulated traffic data as audio traffic data. Similarly, video data from video module 110 may include an identifier that designates the simulated traffic data as video traffic data. VoIP traffic module 106 may then direct the (separately) generated audio traffic data and video traffic data to encapsulation module 112.

Upon receiving the audio traffic data and video traffic data, encapsulation module 112 may access a mapping database 116 that stores mapping information associated with bearer special functions and traffic identifiers. For example, mapping database 116 may contain entries that include associations/mappings between i) identifiers associated with traffic data being generated by voice module 108 and video module 110 and ii) different types of bearer special function tags. Although database 116 is depicted as being stored locally on simulation device 102, a mapping database located externally from simulation device 102 may be utilized without departing from the scope of the present subject matter. After accessing mapping database 116, encapsulation module 112 may be able to promptly assign and/or direct the traffic data generated from VoIP traffic generation module 106 to an appropriate dedicated bearer that connects simulation device 102 to SUT 104. For example, encapsulation module 112 may utilize the mappings in database 116 to forward simulated audio stream data generated by VoIP traffic generation module 106 to a bearer designated and identified as a dedicated audio bearer. Similarly, encapsulation module 112 may utilize the mappings in database 116 to forward simulated video stream data generated by VoIP traffic generation module 106 to a bearer designated and identified as a dedicated video bearer. Thus, the data simulated by simulation device 102 may include identifiers that are mapped to either the dedicated audio bearer or the dedicated video bearer. Once simulation device 102 determines the appropriate dedicated bearer for communicating the audio stream data to SUT 104, encapsulation module 112 encapsulates the audio traffic data and forwards the encapsulated audio traffic data (e.g., in packet form) to SUT 104 via the identified audio bearer. Similarly, encapsulation module 112 may encapsulate the video traffic data and forward the encapsulated video traffic data (e.g., in packet form) to SUT 104 via the identified video bearer. In one embodiment, simulated traffic data is encapsulated and packetized prior to being sent over the dedicated audio bearer and dedicated video bearer to SUT 104.

Figure 2:
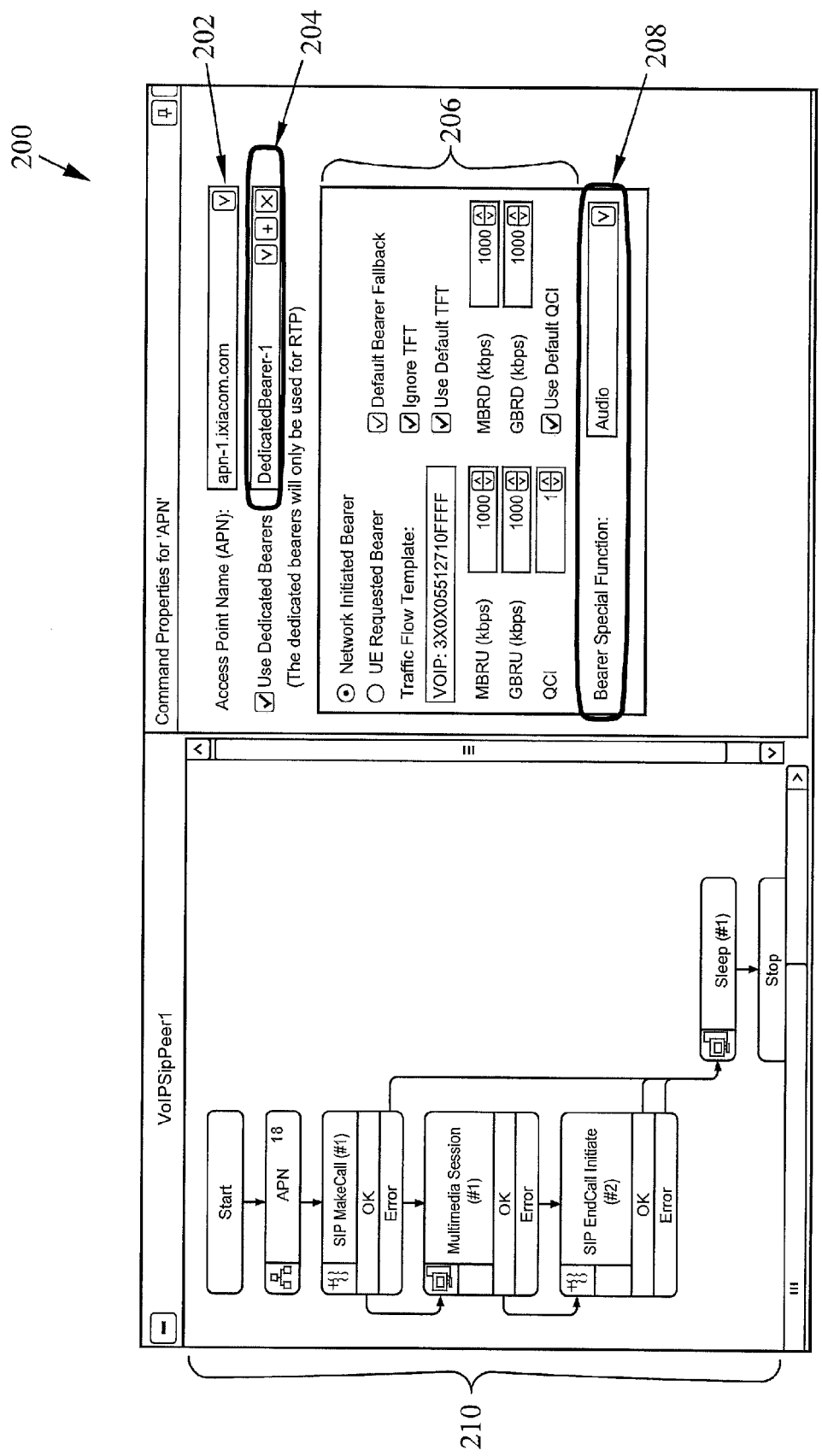
FIG. 2 is an exemplary block diagram illustrating an exemplary screenshot of a configuration graphical user interface (GUI) according to an embodiment of the subject matter described herein.

FIG. 2 is a block diagram illustrating details of an exemplary configuration GUI according to an embodiment of the subject matter described herein. Referring to FIG. 2, screen display 200 includes a first portion that visually depicts the VoIP activity of a particular call session (see "VoIPSipPeer1" window on the left side) and a second portion that includes a GUI in which a user may use to designate or configure parameters for different dedicated bearers (see "Command Properties for APN" window on the right side). As depicted in FIG. 2, the second portion includes a drop-down box 202 in which a user may select an access point name (APN) identifier associated with an access point. In one embodiment, the APN identifies the PGW that will be used for all VoLTE traffic; the PGW can be part of the SUT. For example, the APN may be mapped one-to-one to a PGW being tested as part of an SUT (e.g., an SUT may include either a S/PGW simulating both a SGW and a PGW or may include a separate SGW and PGW).

The second portion also includes drop-down boxes 204 and 208. Specifically, drop-down box 204 may be used to select a single designated bearer. For example, FIG. 2 illustrates that a "DedicatedBearer-1" has been selected with drop-down box 204. An associated section 206 includes underlying protocol parameters that may be configured and/or selected by the user. For example, a user may use portion 206 to designate the designated bearer a network initiated bearer or a user equipment (UE) requested bearer. A user may also select different upload and download parameters as well as related QoS specifications/designations (e.g., a QoS class identifier, a default bearer fallback option, traffic flow template utilization options, and the like). Such parameters may be associated with a particular bearer special function and/or dedicated bearer. Notably, a user may utilize drop-down box 208 in portion 206 to designate a bearer special function to a specific data type, such as audio or video. Referring to FIG. 2, drop-down box 208 depicts the current selection of the bearer special function as "audio". On a separate occasion, drop-down box 204 may be used to designate a second dedicated bearer (e.g., DedicatedBearer-2) and drop-down box 208 may be used to assign a "video" dedicated bearer function to the second dedicated bearer. In some embodiments, the configurations and selections (e.g., made via GUI 107) may be provided to GUI module 105 on simulation device 102.

Figure 3:
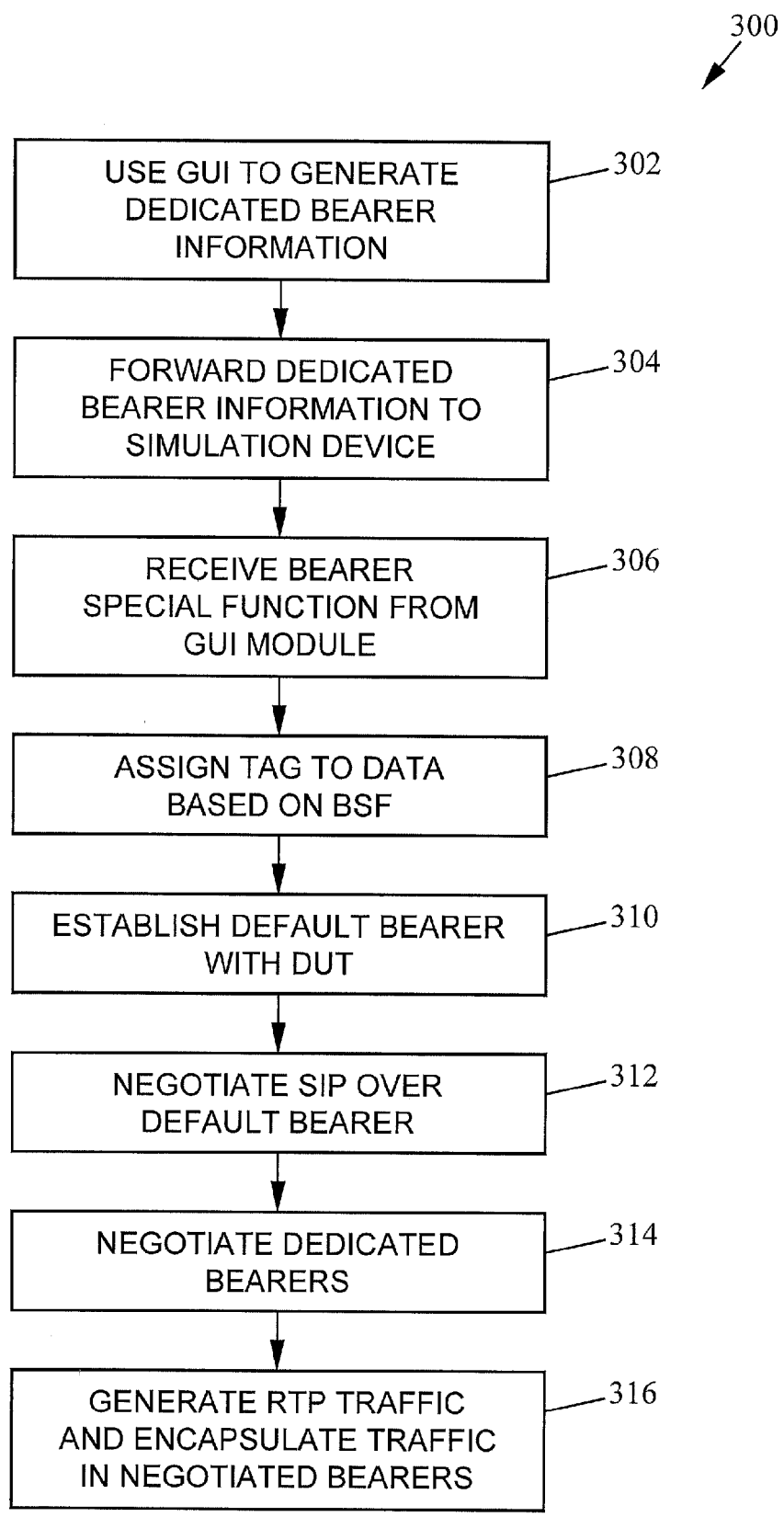
FIG. 3 is a flow chart illustrating exemplary overall steps for assigning separate dedicated bearers for separate audio and video streams in a test simulation environment according to an embodiment of the subject matter described herein.

FIG. 3 is a flow chart illustrating exemplary overall steps of a method 300 for assigning separate dedicated bearers for separate audio and video streams in a test simulation environment according to an embodiment of the subject matter described herein. In step 302, a GUI is used to generate dedicated bearer information to be used for a VoLTE communication session. In one embodiment, a network administrator or other user may use a GUI on a control device to select generate dedicated bearer information by establishing a plurality of dedicated bearers, corresponding bearer special functions, and associated performance parameters/requirements in a manner described above. In response to using a GUI to make selections, the control device may be configured to generate dedicated bearer information associated with the GUI selections.

In step 304, the dedicated bearer information is forwarded. In one embodiment, the control device may send the dedicated bearer information (containing the bearer special function(s)) to a GUI interface module residing on a simulation device.

In step 306, a bearer special function is received. In one embodiment, an encapsulation module on a simulation device receives one or more bearer special functions from a GUI module. Notably, the GUI module may receive the bearer special function designation from a user using a GUI in a control device.

In step 308, an identifier is assigned to data. In one embodiment, a VoIP traffic generation module assigns an identifier to the simulated traffic data based on the bearer special function. For example, an "audio identifier" may be assigned or mapped to audio traffic that is eventually generated by voice module 108 and a "video identifier" is assigned to video traffic that is eventually generated by video module 110. In one embodiment, the "audio identifier" is included in ancillary data (e.g., contained a software structure) and is transferred together with the audio traffic to encapsulation module 112 when the audio traffic is ultimately sent (e.g., see step 316 below). Similarly, the "video identifier" is included in ancillary data (e.g., contained in a software structure) that is transferred together with the video traffic to encapsulation module 112 when the video traffic is ultimately sent.

In step 310, a default bearer is established. In one embodiment, a GTPv2 default bearer is established between the simulation device and the system under test. For example, a default bearer is negotiated and established by the simulation device to simulate when a 4G phone gets on the network.

In step 312, a SIP session is negotiated over a default bearer. In one embodiment, a SIP session in negotiated between the SUT and the testing element (e.g., simulation device). During the SIP negotiation, parameters for the dedicated bearers are also established.

In step 314, establishment of dedicated bearers is negotiated. In one embodiment, a dedicated bearer for audio and a dedicated bearer for video between the simulation device and the SUT are negotiated. For example, GTP negotiation of dedicated bearers may be triggered when two voice peers, such as the SUT and the simulation device, determine what voice and video parameters is to be used during the negotiation.

In step 316, media traffic is generated. In one embodiment, simulated RTP test traffic is generated by the simulation device. The simulation device may also encapsulate the RTP voice traffic and the RTP video traffic in the previously negotiated dedicated bearers. For example, an encapsulation module in the simulation device may be configured to encapsulate the VoIP packets generated by the audio module and video module with a GTP+UDP+IP header. The media traffic is then forwarded to the system under test (or a device under test). In one embodiment, the simulated traffic data is sent to the SUT over the dedicated audio bearer and the dedicated video bearer in accordance with a mapping (e.g., mapping contained in a mapping database) based on the dedicated bearer information and identifiers included in the simulated traffic.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for assigning separate dedicated bearers for audio and video streams in a test simulation environment, the method comprising:
   generating dedicated bearer information associated with each of a dedicated audio bearer and a dedicated video bearer to be used for a communication session, wherein generating the dedicated bearer information includes utilizing a graphical user interface (GUI) to generate the dedicated bearer information for each of the dedicated audio bearer and the dedicated video bearer, and wherein the dedicated bearer information includes a bearer special function and at least one associated parameter that includes at least one of: an upload rate, a download rate, a QoS class identifier, a default bearer fallback option, and a traffic flow template utilization option;
   providing the dedicated bearer information to a simulation device;
   from the simulation device, using the dedicated bearer information to negotiate establishment of the dedicated audio bearer and the dedicated video bearer with a system under test (SUT); and
   sending simulated traffic data to the SUT over the dedicated audio bearer and the dedicated video bearer in accordance with a mapping based on the dedicated bearer information and identifiers included in the simulated traffic, wherein sending simulated traffic data to the SUT includes utilizing an encapsulation module within the simulation device to access a mapping database, which maps an audio identifier to the dedicated audio bearer and maps a video identifier to the dedicated video bearer, to direct simulated audio traffic data generated by a voice module over the dedicated audio bearer using the audio identifier and send simulated video traffic data generated by a video module over the dedicated video bearer using the video identifier.

2. The method of claim 1 wherein utilizing the GUI includes selecting a dedicated bearer identifier and an associated bearer special function using one or more drop-down boxes.

3. The method of claim 1 wherein the simulated traffic data is encapsulated and packetized prior to being sent over the dedicated audio bearer and the dedicated video bearer.

4. The method of claim 1 wherein using the dedicated bearer information to negotiate establishment of the dedicated audio bearer and the dedicated video bearer includes tagging the dedicated audio bearer and the dedicated bearer in accordance with the dedicated bearer information.

5. The method of claim 1 wherein the simulated traffic data includes identifiers that are mapped to either the dedicated audio bearer or the dedicated video bearer.

6. The method of claim 1 further comprising assigning the simulated traffic data to either the dedicated audio bearer or the dedicated video bearer based on the identifiers included in the simulated traffic data.

7. The method of claim 1 wherein negotiation of the dedicated audio bearer and the dedicated video bearer are initiated by the system under test.

8. The method of claim 1 wherein the system under test includes at least one of a serving gateway (SGW) element, a packet data network gateway (PGW) element, and a policy and charging rules function (PCRF) node.

9. The method of claim 1 wherein the simulated traffic data includes real-time transport protocol (RTP) traffic data.

10. A system for assigning separate dedicated bearers for audio and video streams in a test simulation environment, the system comprising:
    a control device configured to generate dedicated bearer information associated with each of a dedicated audio bearer and a dedicated video bearer to be used for a communication session, wherein the control device includes a graphical user interface (GUI) that is utilized to generate the dedicated bearer information for each of the dedicated audio bearer and the dedicated video bearer, and wherein the dedicated bearer information includes a bearer special function and at least one associated parameter that includes at least one of: an upload rate, a download rate, a QoS class identifier, a default bearer fallback option, and a traffic flow template utilization option;
    a simulation device configured to receive the dedicated bearer information from the control device, to use the dedicated bearer information to negotiate establishment of the dedicated audio bearer and the dedicated video bearer with a system under test (SUT), and to send simulated traffic data to the SUT over the dedicated audio bearer and the dedicated video bearer in accordance with to a mapping based on the dedicated bearer information and identifiers included in the simulated traffic, wherein the simulation device includes an encapsulation module that is configured to access a mapping database, which maps an audio identifier to the dedicated audio bearer and maps a video identifier to the dedicated video bearer, to direct simulated audio traffic data generated by a voice module over the dedicated audio bearer using the audio identifier and send simulated video traffic data generated by a video module over the dedicated video bearer using the video identifier.

11. The system of claim 10 wherein the control device is further configured to select a dedicated bearer identifier and an associated bearer special function using one or more drop-down boxes.

12. The system of claim 10 wherein the simulation device is further configured to encapsulate and packetize the simulated traffic data prior to being sent over the dedicated audio bearer and the dedicated video bearer.

13. The system of claim 10 wherein the simulation device is further configured to tag the dedicated audio bearer and the dedicated bearer in accordance with the dedicated bearer information.

14. The system of claim 13 wherein the simulation device is further configured to assign the simulated traffic data to either the dedicated audio bearer or the dedicated video bearer based on the identifiers included in the simulated traffic data.

15. The system of claim 10 wherein negotiation of the dedicated audio bearer and the dedicated video bearer are initiated by the system under test.

16. The system of claim 10 wherein the system under test includes at least one of a serving gateway (SGW) element, a packet data network gateway (PGW) element, and a policy charging and rules function (PCRF) node.

17. The system of claim 10 wherein the simulated traffic data includes real-time transport protocol (RTP) traffic data.

18. A non-transitory computer readable medium having stored thereon executable instructions that when executed by the processor of a computer controls the computer to perform steps comprising:

generating dedicated bearer information associated with each of a dedicated audio bearer and a dedicated video bearer to be used for a communication session, wherein generating the dedicated bearer information includes utilizing a graphical user interface (GUI) to generate the dedicated bearer information for each of the dedicated audio bearer and the dedicated video bearer, and wherein the dedicated bearer information includes a bearer special function and at least one associated parameter that includes at least one of: an upload rate, a download rate, a QoS class identifier, a default bearer fallback option, and a traffic flow template utilization option;

providing the dedicated bearer information to a simulation device;

from the simulation device, using the dedicated bearer information to negotiate establishment of the dedicated audio bearer and the dedicated video bearer between the simulation device and a system under test (SUT); and sending simulated traffic data to the SUT over the dedicated audio bearer and the dedicated video bearer in accordance with a mapping based on the dedicated bearer information and identifiers included in the simulated traffic, wherein sending simulated traffic data to the SUT includes utilizing an encapsulation module within the simulation device to access a mapping database, which maps an audio identifier to the dedicated audio bearer and maps a video identifier to the dedicated video bearer, to direct simulated audio traffic data generated by a voice module over the dedicated audio bearer using the audio identifier and send simulated video traffic data generated by a video module over the dedicated video bearer using the video identifier.

* * * * *